US012604099B2

(12) United States Patent
Yamasaki

(10) Patent No.: US 12,604,099 B2
(45) Date of Patent: Apr. 14, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Shogo Yamasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 18/401,093

(22) Filed: Dec. 29, 2023

(65) Prior Publication Data

US 2024/0236500 A1 Jul. 11, 2024

(30) Foreign Application Priority Data

Jan. 5, 2023 (JP) ................................. 2023-000708

(51) Int. Cl.
*H04N 23/741* (2023.01)
*H04N 23/71* (2023.01)
*H04N 23/73* (2023.01)

(52) U.S. Cl.
CPC ........... *H04N 23/741* (2023.01); *H04N 23/71* (2023.01); *H04N 23/73* (2023.01)

(58) Field of Classification Search
CPC ....... H04N 23/741; H04N 23/71; H04N 23/73
See application file for complete search history.

(56) References Cited

U.S. PATENT DOCUMENTS

2012/0081581 A1* 4/2012 Ichihara ................. G03B 15/05
348/238

FOREIGN PATENT DOCUMENTS

JP 6935272 B2 9/2021

* cited by examiner

*Primary Examiner* — Ahmed A Berhan
(74) *Attorney, Agent, or Firm* — Canon U.S.A., Inc. IP Division

(57) ABSTRACT

An image processing apparatus processes image data captured by an image sensor that allows setting of an exposure value for each region of the image sensor, and sets the exposure value for each region based on a magnitude of luminance contrast in each region.

7 Claims, 9 Drawing Sheets

| | | EXPOSURE TIME ID | 1 | 2 | 3 |
|---|---|---|---|---|---|
| | | EXPOSURE TIME [SECONDS] | 1/60 | 1/120 | 1/240 |
| GAIN ID | ANALOG GAIN [TIMES] | | | | |
| 0 | 8 | | 0 | 1 | 2 |
| 1 | 4 | | 1 | 2 | 3 |
| 2 | 2 | | 2 | 3 | 4 |
| 3 | 1 | | 3 | 4 | 5 |

FIG.7

| LUMINANCE CONTRAST | EXPOSURE CONDITION CORRECTION PARAMETER |
|---|---|
| 0 | 0 |
| 1 | 0 |
| 2 | 0 |
| 3 | 0 |
| 4 | 0 |
| 5 | -1 |
| 6 | -2 |
| 7 | -3 |
| 8 | -4 |

FIG.8

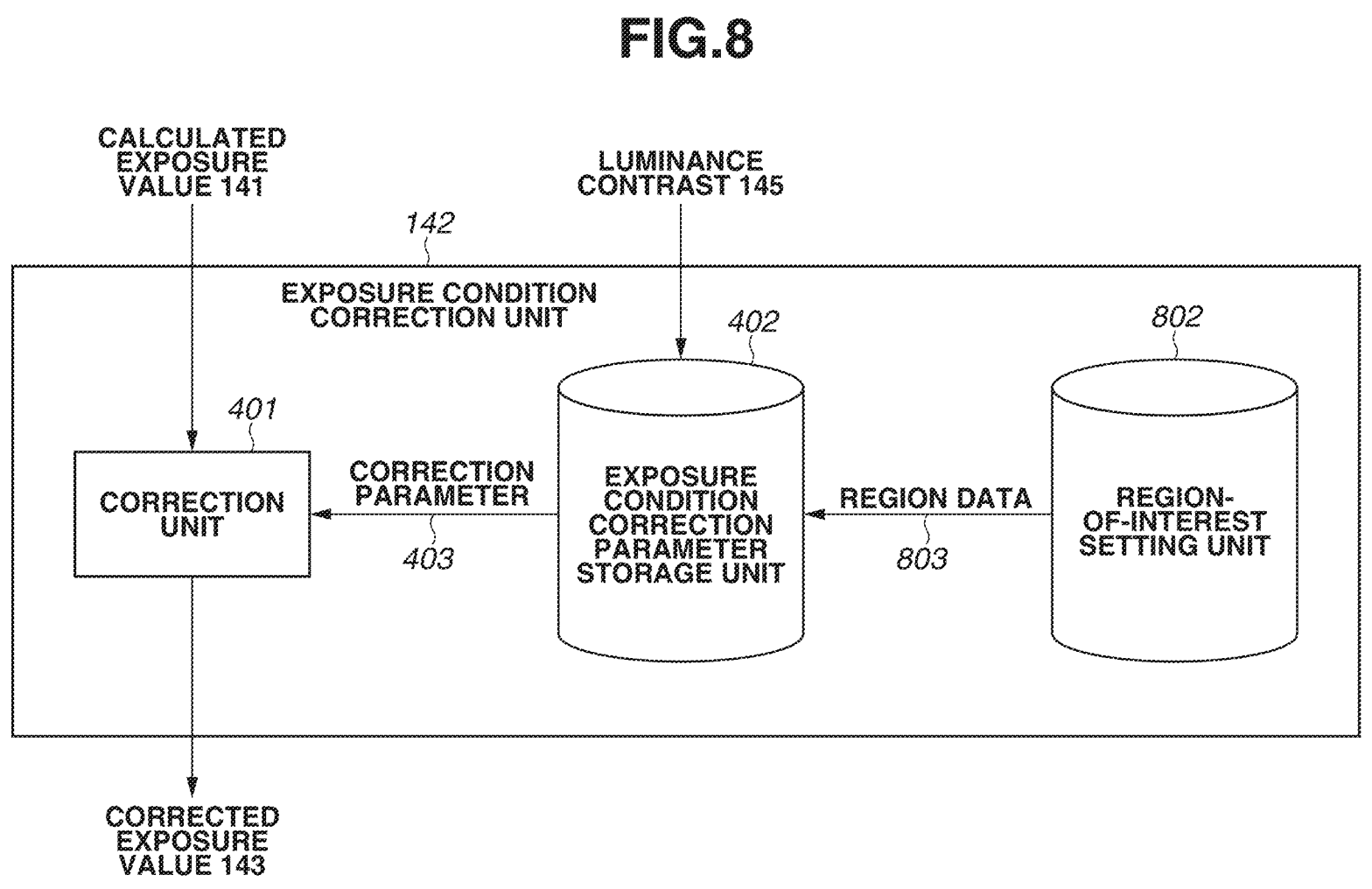

CALCULATED EXPOSURE VALUE 141

LUMINANCE CONTRAST 145

EXPOSURE CONDITION CORRECTION UNIT

142

REGION-OF-INTEREST SETTING UNIT

802

REGION DATA

803

EXPOSURE CONDITION CORRECTION PARAMETER STORAGE UNIT

402

CORRECTION PARAMETER

403

CORRECTION UNIT

401

CORRECTED EXPOSURE VALUE 143

IMAGE PROCESSING APPARATUS, IMAGE PROCESSING METHOD, AND STORAGE MEDIUM

BACKGROUND OF THE DISCLOSURE

Field of the Disclosure

The present disclosure relates to an image processing apparatus configured to process image data captured by an image sensor that allows setting of an exposure value for each region of the image sensor, an image processing method, and a storage medium.

Description of the Related Art

A dynamic range of a camera is limited by a saturation electron count of an image sensor and bit precision in analog/digital (A/D) conversion. Various methods have been developed to expand a dynamic range of a camera by partially changing exposure settings (exposure time, analog gain) of an image sensor. Some techniques involve setting exposure settings for each of a plurality of divided regions of a light-receiving area of an image sensor, and multiplying a digital signal acquired by the image sensor by a correction gain for each region that is calculated based on the exposure settings, so that a difference in exposure settings between the regions can be corrected.

Nevertheless, in capturing an image with a significant difference in luminance within a frame, the difference between the exposure settings set for the regions becomes significant, and difference in image quality may occur between the regions. Even in a case where a difference in luminance within a region is significant, either bright areas or dark areas are prioritized in exposure, so that noise and overexposure may occur. A numerical value representing an exposure level will be referred to as an "exposure value". The more significant the difference in exposure, the greater the difference between the exposure values.

On the contrary, Japanese Patent Application No. 6935272 discusses a method for correcting exposure values to reduce a difference between maximum and minimum values of exposure values of regions within a frame. Specifically, the exposure values are corrected by performing a process of setting an allowable maximum exposure difference and normalizing the difference between the maximum and minimum values of the exposure values within the frame to the set maximum exposure difference.

Nevertheless, in a case where an image has a significant difference in luminance in an entire frame, the process of reducing the difference between the maximum and minimum values of the exposure values of the regions within the frame to the set value may cause an unnecessary change of an optimum exposure value. Thus, there is a possibility of a decrease in effect of high dynamic range. Since the process is not based on a difference between exposure values of adjacent regions, a difference in image quality may occur at a boundary between adjacent regions in a case where there is a significant exposure difference between the adjacent regions. Even in a case where a difference in luminance within a region is significant, either bright areas or dark areas are prioritized in exposure, so that noise and overexposure may occur.

SUMMARY OF THE DISCLOSURE

The present disclosure considers the above-described issues and is directed to performing suitable exposure to reduce anomalies in image quality, such as noise and over-exposure, that occur between regions or within a region having a significant difference between bright and dark areas.

According to an aspect of the present disclosure, an image processing apparatus processes image data captured by an image sensor that allows setting of an exposure value for each region of the image sensor, and sets the exposure value for each region based on a magnitude of luminance contrast in each region.

Further features of the present disclosure will become apparent from the following description of exemplary embodiments with reference to the attached drawings.

BRIEF DESCRIPTION OF THE DRAWINGS

FIG. 1 is a block diagram illustrating a schematic configuration of an imaging apparatus according to a first and a second exemplary embodiments.

FIG. 3 is a diagram illustrating exposure values.

FIG. 7 is a diagram illustrating an example of exposure condition correction parameters.

FIG. 8 is a block diagram illustrating an exposure condition correction unit according to the second exemplary embodiment.

DESCRIPTION OF THE EMBODIMENTS

Figure 2:
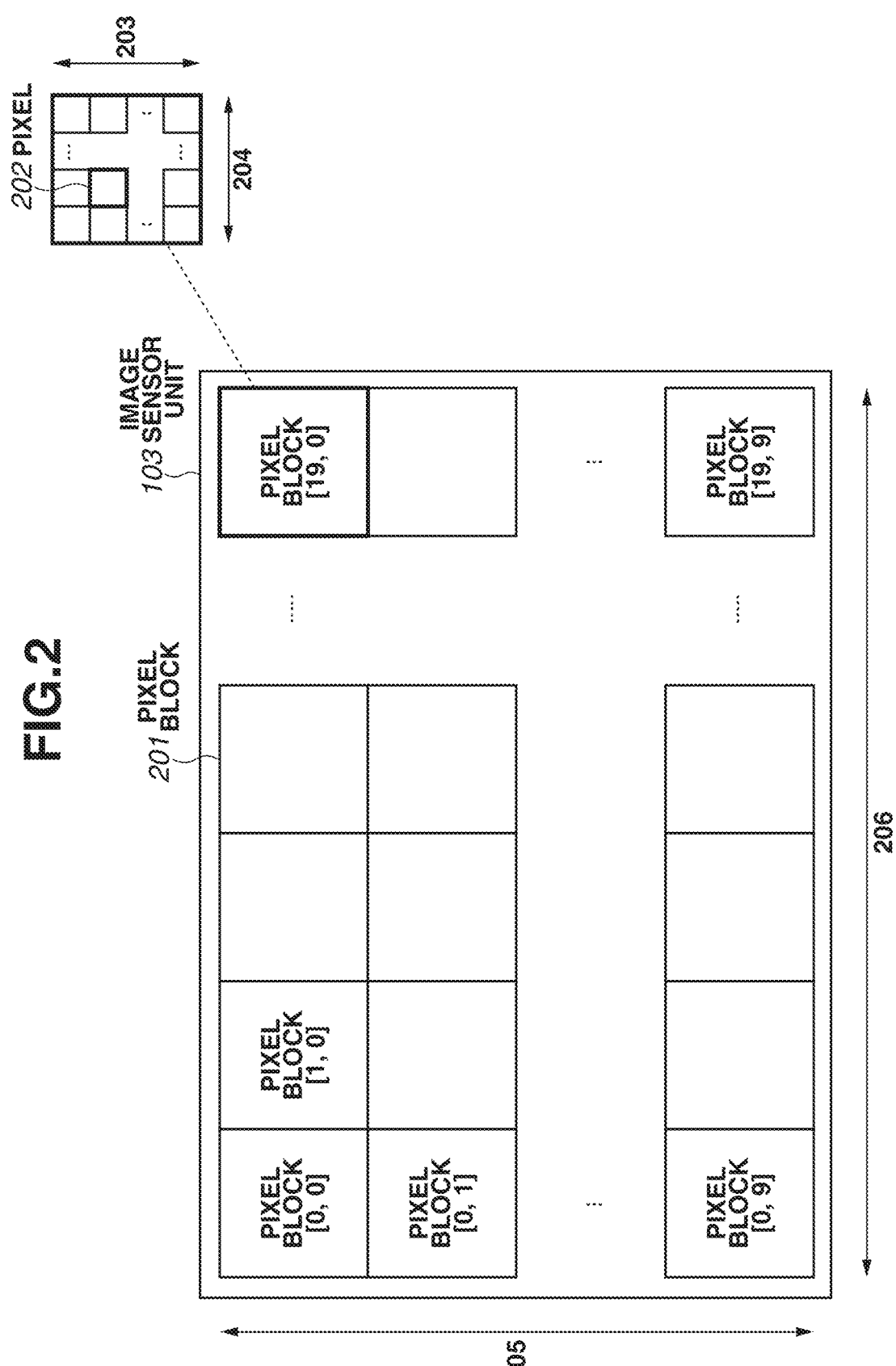
FIG. 2 is a diagram illustrating regions of an image sensor unit.

Exemplary embodiments of techniques of the present disclosure will be described in detail below with reference to the attached drawings. It is to be noted that the exemplary embodiments described below are not intended to limit the claimed techniques of the present disclosure and that not all combinations of features according to the exemplary embodiments are always essential to a technical solution of the present disclosure. Similar components or processes are given the same reference number.

Figure 1:
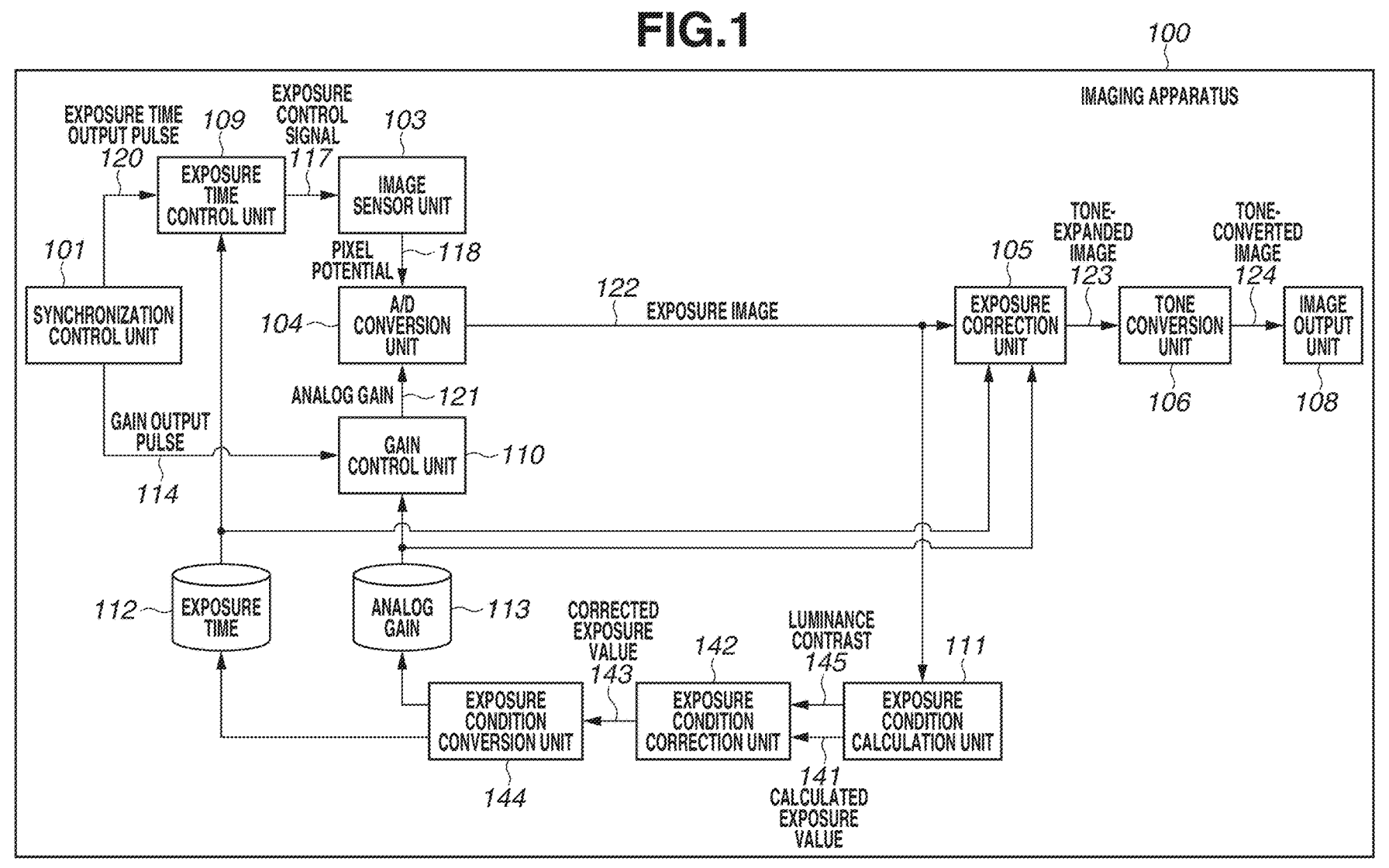

FIG. 1 is a block diagram illustrating an example of a schematic configuration of an imaging apparatus 100 according to a first exemplary embodiment. While the imaging apparatus 100 according to the present exemplary embodiment is an image processing apparatus including various components that a typical imaging apparatus includes, FIG. 1 only illustrates a main portion according to the present exemplary embodiment for simplification of illustration and description. Each component can also be implemented by an image processing apparatus or an image processing program.

The imaging apparatus 100 includes a synchronization control unit 101, an image sensor unit 103, an analog-to-digital (A/D) conversion unit 104, and an exposure correction unit 105. The imaging apparatus 100 further includes a tone conversion unit 106, an image output unit 108, an exposure time control unit 109, a gain control unit 110, an exposure condition calculation unit 111, an exposure condition correction unit 142, and an exposure condition conversion unit 144.

An overview of the components of the imaging apparatus 100 according to the present exemplary embodiment will firstly be described starting from the image sensor unit 103.

The image sensor unit 103 includes an imaging region. The imaging region is divided into a plurality of regions referred to as pixel blocks. The image sensor unit 103 can be driven in units of pixel blocks (regions) and has a function of performing an exposure operation (charge accumulation) for different exposure times for different regions. Details of the pixel blocks will be described below. According to the present exemplary embodiment, an exposure time is set for each region of the image sensor unit 103 based on an exposure control signal 117 fed from the exposure time control unit 109. Each region is exposed for the exposure time set for the region. The exposure control signal 117 is a signal for setting an exposure time for each region of the image sensor unit 103 individually. The image sensor unit 103 then reads, as a pixel potential 118, charge accumulated in pixels of each region for the exposure time set for the region based on the exposure control signal 117, and outputs the pixel potential 118 to the A/D conversion unit 104. The A/D conversion unit 104 performs A/D conversion on the pixel potential 118 read from the image sensor unit 103 into a digital value. According to the present exemplary embodiment, an analog gain 121 for each region described above is set on the A/D conversion unit 104 by the gain control unit 110. The A/D conversion unit 104 multiplies the pixel potential 118 output from the image sensor unit 103 by the analog gain 121 for each region, and thereafter performs A/D conversion into a digital value. Hereinafter, an image composed of the digital signals obtained through the multiplication by the analog gain 121 for each region and the A/D conversion by the A/D conversion unit 104 will be referred to as "exposure image 122". The exposure image 122 output from the A/D conversion unit 104 is transmitted to the exposure condition calculation unit 111 and the exposure correction unit 105.

The exposure condition calculation unit 111 calculates an exposure value for each region based on the exposure image 122 to optimize imaging conditions and outputs the calculation result as a calculated exposure value 141. Specifically, the exposure condition calculation unit 111 calculates a histogram of pixel values for each pixel block based on a luminance distribution of the exposure image 122. If the pixel values are distributed in brighter portions, the exposure condition calculation unit 111 calculates the calculated exposure value 141 for each region to set setting values for darker imaging. If the pixel values are distributed in darker portions, the exposure condition calculation unit 111 calculates the calculated exposure value 141 for each region to set setting values for brighter imaging. The exposure condition correction unit 142 corrects the calculated exposure value 141 and generates a corrected exposure value 143. Details thereof will be described below. The exposure condition conversion unit 144 converts the corrected exposure value 143 into an exposure time 112 and an analog gain 113 and updates the exposure time 112 and the analog gain 113. The value of the exposure time 112 for each region is transmitted to the exposure time control unit 109 and the exposure correction unit 105. The analog gain 113 for each region is transmitted to the gain control unit 110 and the exposure correction unit 105.

A concept of exposure values will now be described with reference to FIG. 3. An exposure value is a numerical value representing an exposure level which comes from a combination of an exposure time and an analog gain. The exposure time and the analog gain are each a parameter relating to an imaging condition. Indexes of an exposure time identifier (exposure time ID) and a gain identifier (gain ID) that are a condition for the brightest imaging are each set to zero. Thus, the combination of the exposure time ID with the index of zero (exposure time: 1/60 seconds) and the gain ID with the index of zero (analog gain: 8 times) is a condition for the brightest imaging. In contrast, a combination of an exposure time ID with the greatest index and a gain ID with the greatest index is a condition for the darkest imaging. FIG. 3 presents three exposure time levels and four gain levels. The combinations of these exposure times and analog gains are mere examples and are not intended to be a limitation. Each exposure value is represented as a value obtained by adding an exposure time ID and a gain ID, and the condition for the brightest imaging corresponds to an exposure value of 0.0 whereas the condition for the darkest imaging corresponds to an exposure value of 5.0. Precisions of exposure values are not particularly defined and can be either an integer or a decimal number, and exposure values described herein have decimal precisions. A bit width is wider in a case where the precision is decimal than in a case where the precision is represented by an integer alone, and the desired decimal precision is determined based on image quality that is intended to realize. In converting an exposure value into an exposure time or an analog gain, the exposure value is converted into an integer by rounding as described below in descriptions of the exposure condition conversion unit 144 prior to the conversion.

The synchronization control unit 101 generates an exposure time output pulse 120 and a gain output pulse 114 in synchronization with each other. The synchronization control unit 101 outputs the generated exposure time output pulse 120 to the exposure time control unit 109. The synchronization control unit 101 outputs the generated gain output pulse 114 to the gain control unit 110. The synchronization control unit 101 thereby synchronously controls the processing of the exposure time control unit 109 and the processing of the gain control unit 110. The exposure time output pulse 120 is a signal for controlling a timing at which the exposure time control unit 109 outputs the exposure control signal 117 to the image sensor unit 103. The exposure time control unit 109 outputs the exposure control signal 117 to the image sensor unit 103 based on the exposure time output pulse 120, thereby changing the exposure time for each pixel block of the image sensor unit 103 as desired. The gain output pulse 114 is a signal for controlling a timing at which the gain control unit 110 outputs the analog gain 121 to the A/D conversion unit 104. The gain control unit 110 outputs the analog gain 121 to the A/D conversion unit 104 based on the gain output pulse 114, thereby changing the gain for each pixel block by which the pixel potential 118 is to be multiplied, as desired. As described above, according to the present exemplary embodiment, the synchronization control unit 101 controls operations of the exposure time control unit 109 and the gain control unit 110 in synchronization with each other, whereby the exposure image 122 using different exposure times and different analog gains for different pixel blocks of the image sensor unit 103 is output.

The exposure time control unit 109 generates the exposure control signal 117 for each region based on the exposure time output pulse 120 and the value of the exposure time 112 for the region, and outputs the generated exposure control signal 117 to the image sensor unit 103. Consequently, an exposure time based on the exposure time 112 for the region is set on the image sensor unit 103 at an appropriate timing.

The gain control unit 110 outputs, as the analog gain 121 for each region that corresponds to the pixel potential 118 for the region of the image sensor unit 103, the analog gain 113 for each region at a timing synchronized with the gain output pulse 114 to the A/D conversion unit 104. Consequently, the A/D conversion unit 104 performs A/D conversion after the pixel potential 118 for each region is multiplied by the corresponding analog gain 121 for the region. The A/D-converted data is transmitted to the exposure correction unit 105 as the exposure image 122 for each region.

The exposure correction unit 105 performs tone expansion processing on the exposure image 122 for each region transmitted from the A/D conversion unit 104 and generates a tone-expanded image 123. For example, conditions of imaging of the input exposure image 122 for each region is identified, and the exposure image 122 for each region is corrected using the exposure time 112 for the region and the analog gain 113 for the region. The exposure correction unit 105 generates the tone-expanded image 123 represented in 17 bits by, for example, performing tone expansion processing on the exposure image 122 for each region that is represented in 10 bits. The generated tone-expanded image 123 is then transmitted to the tone conversion unit 106.

The tone conversion unit 106 performs tone conversion on the tone-expanded image 123 and outputs a tone-converted image 124 to the image output unit 108. According to the present exemplary embodiment, the tone conversion is a process of performing gamma conversion on the 17-bit tone-expanded image 123 to generate, for example, the 11-bit tone-converted image 124. The tone conversion processing according to the present exemplary embodiment is performed to reduce a data rate in subsequent processing. While the bit length of the exposure image 122 and the bit length of the tone-converted image 124 are 10 bits and 11 bits, respectively, according to the present exemplary embodiment, the bit lengths are mere examples and are not intended to be limited thereto.

The image output unit 108 outputs, as image data, the tone-converted image 124 to a subsequent component of the imaging apparatus 100 or to the outside.

Configuration of Image Sensor Unit

FIG. 2 is a diagram illustrating an example of a configuration of the image sensor unit 103. The imaging region of the image sensor unit 103 includes a plurality of pixel blocks 201. Each pixel block 201 also includes a plurality of pixels 202. According to the present exemplary embodiment, the number of pixels in the imaging region of the image sensor unit 103 is 2000 in a width 206 direction (horizontal line direction) and 1000 in a height 205 direction (i.e., the number of horizontal lines in the vertical direction is 1000). The number of pixels in each pixel block 201 is 100 in a width 204 direction (horizontal line direction) and 100 in a height 203 direction (corresponding to 100 horizontal lines in the vertical direction). In this case, the number of pixel blocks 201 in the imaging region of the image sensor unit 103 is 20 in the horizontal direction and 10 in the vertical direction. Further, pixel blocks [0, 0] to [19, 9] described in the pixel blocks 201 in FIG. 2 represent positions of the pixel blocks 201 in the imaging region, and values in the square brackets [ ] in each pixel block represent indexes of the pixel block in the horizontal and vertical directions in the imaging region. For example, the pixel block 201 at the upper right of the image sensor unit 103 in FIG. 2 is the pixel block [19, 0]. Further, a set of pixel blocks represented by the same index in the vertical direction will be referred to as "block column".

Specifically, a block column N consists of pixel blocks [0, N] to [19, N]. For example, a block column 5 consists of the pixel blocks [0, 5] to [19, 5]. Sizes (the number of pixels in the vertical and horizontal directions) of the image sensor unit 103 and the pixel block 201 are not limited to the above-described examples. Shapes and aspect ratios of the pixels 202 are also not limited, and the pixels 202 can be not square but, for example, rectangular. Furthermore, each pixel block 201 can consist of one pixel 202 only.

According to the present exemplary embodiment, the exposure time and the analog gain are controllable for each pixel block 201.

The exposure time herein corresponds to a time during which charge is accumulated in the pixels (light-sensitive elements) 202 of the image sensor unit 103 in imaging. Thus, for example, in a case where the amount of incident light on the image sensor unit 103 is the same and the pixels 202 do not saturate, the longer the exposure time is, the higher the pixel potential 118 becomes, and brighter imaging is performed. Specifically, in a case where the amount of incident light is the same and pixel saturation is not considered, brighter imaging is performed in a case where the exposure time is $\frac{1}{60}$ seconds than in a case where the exposure time is $\frac{1}{240}$ seconds.

The analog gain is a gain by which the pixel potential 118 is multiplied by the A/D conversion unit 104 in imaging. Thus, the greater the value of the analog gain is, the greater the digital pixel value (digital value obtained by the A/D conversion after the multiplication by the gain) output from the A/D conversion unit 104 becomes.

Back to FIG. 1, a configuration and operations of the imaging apparatus 100 according to the present exemplary embodiment will now be described in detail.

The image sensor unit 103 performs imaging while controlling the exposure time in units of the pixel blocks 201 based on the exposure control signal 117. The image sensor unit 103 then outputs the pixel potential 118 corresponding to the accumulated charge for each pixel.

The A/D conversion unit 104 performs digital conversion after multiplying the pixel potential 118 output from the image sensor unit 103 by the analog gain 121 set for each pixel block 201 of the image sensor unit 103 and outputs the exposure image 122. According to the present exemplary embodiment, the exposure image 122 has 10-bit digital values. The analog gain 121 can have, for example, four gain values of 1 time, 2 times, 4 times, and 8 times.

Operations of Exposure Condition Correction Unit

Figure 4:
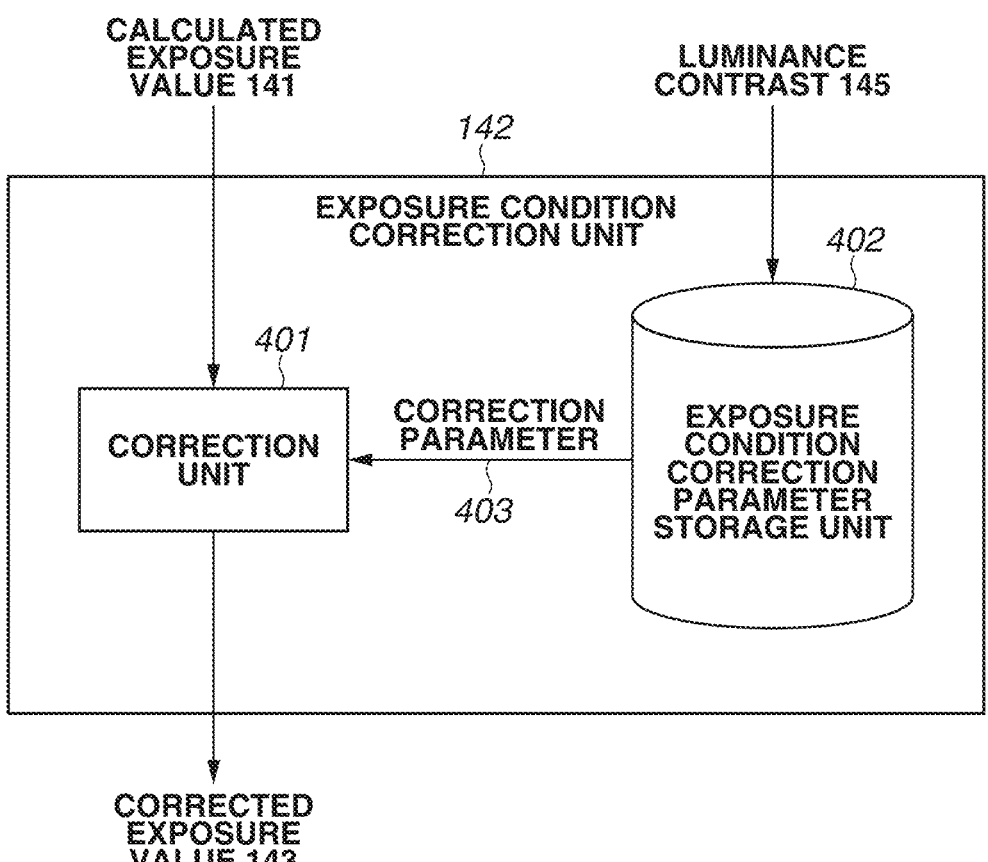
FIG. 4 is a block diagram illustrating an exposure condition correction unit according to the first exemplary embodiment.

Operations of the exposure condition correction unit 142 will now be described with reference to FIG. 4. The exposure condition correction unit 142 corrects the calculated exposure value 141 that is an exposure value output from the exposure condition calculation unit 111. In FIG. 4, the exposure condition correction unit 142 includes a correction unit 401 and an exposure condition correction parameter storage unit 402. Forms of implementation of processing of the components are not particularly limited. Forms of implementation as a hardware circuit or forms of implementation as software configured to be processed by a central processing unit (CPU) can be used. The forms can also be used in combination. While the processing of the exposure condition correction unit 142 is performed on the calculated exposure value 141 output from the exposure condition calculation unit 111 in the described example according to the present exemplary embodiment, the processing of the exposure condition correction unit 142 can be performed simultaneously with the calculation of the calculated exposure value 141 by the exposure condition calculation unit 111.

Figure 5:
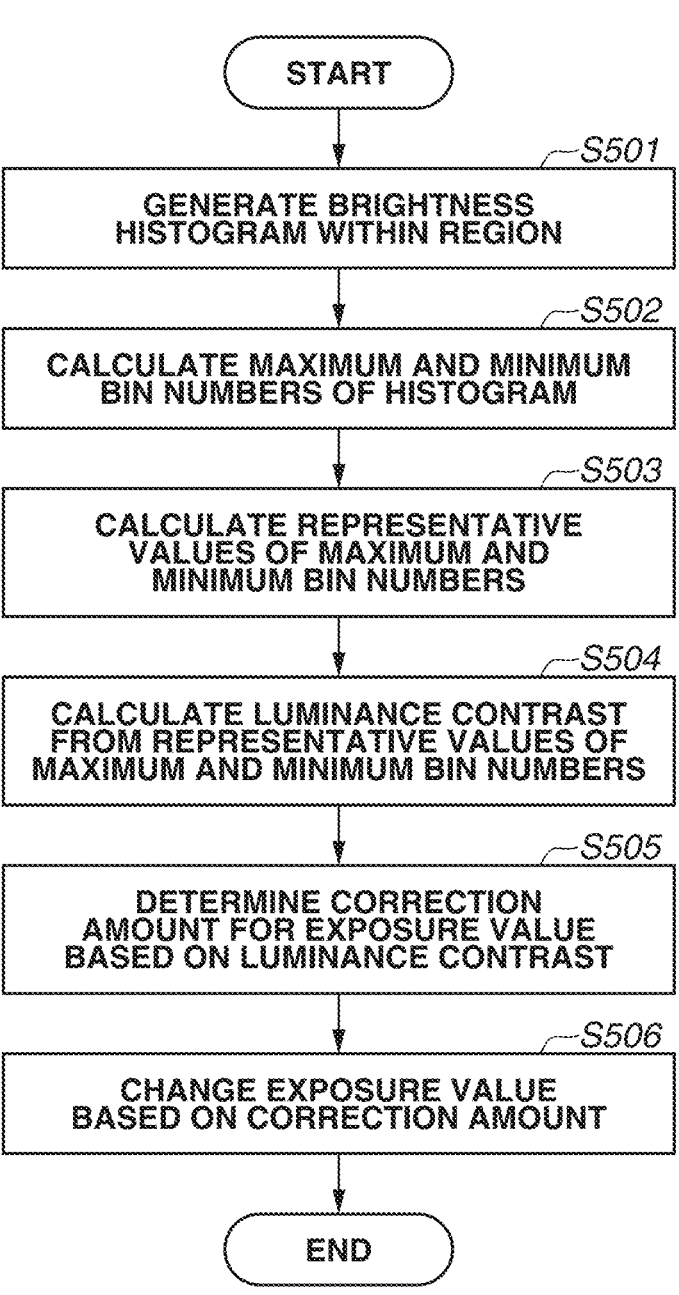
FIG. 5 is a flowchart illustrating the exposure condition correction unit.
Figure 6A:
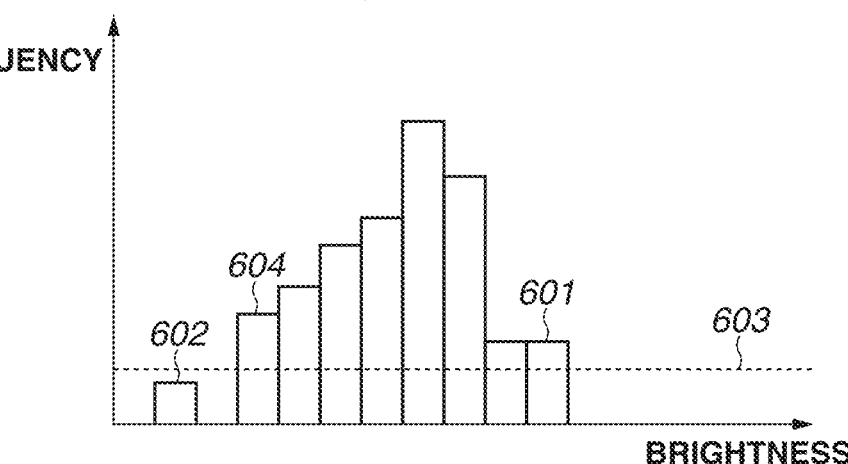
FIGS. 6A, 6B, and 6C are diagrams illustrating examples of histograms for luminance contrast calculation.
Figure 6B:
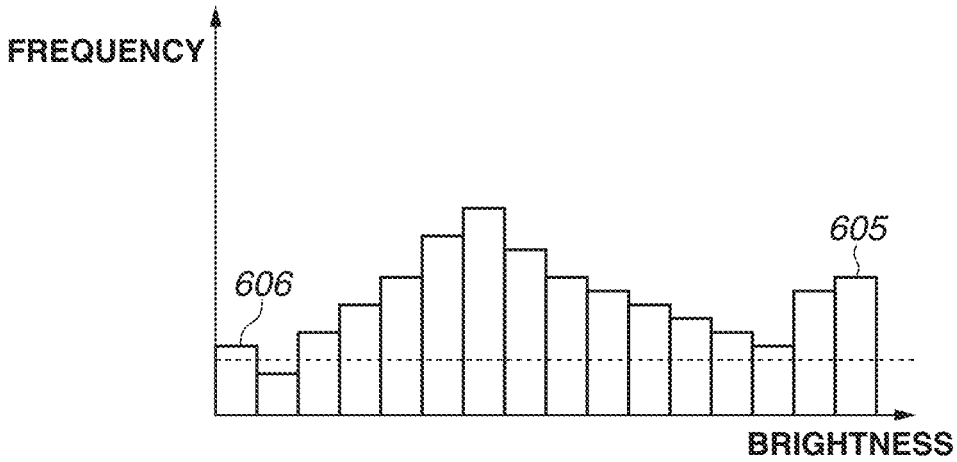
Figure 6C:
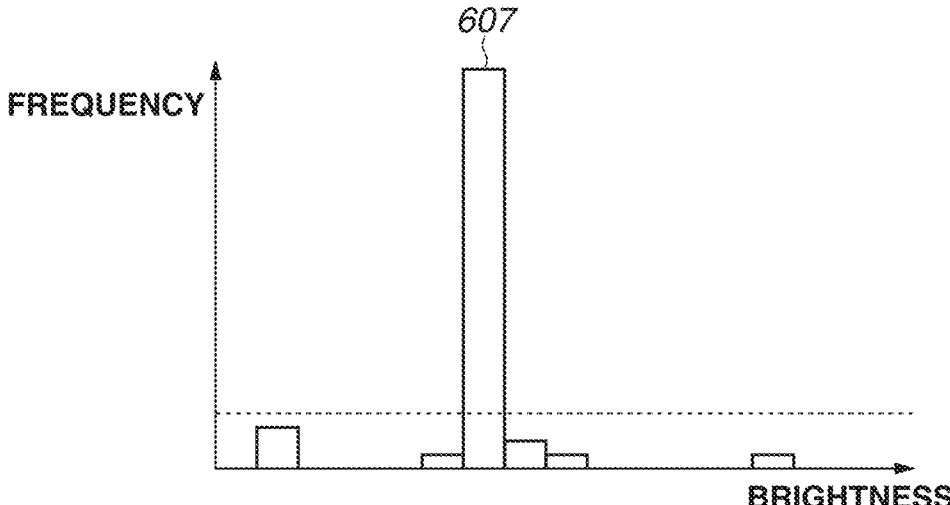

A processing flow performed by the exposure condition correction unit 142 will now be described with reference to a flowchart in FIG. 5. In step S501, a pixel value histogram is generated for each pixel block 201 based on a luminance distribution of the exposure image 122. FIGS. 6A to 6C illustrate examples of histograms. The histogram generation can be performed by the exposure condition calculation unit 111 as described above or by another component. In the pixel block histogram in FIG. 6B, there are brighter portions and darker portions together in the pixel block 201, compared to the pixel block histogram in FIG. 6A. Specifically, the dynamic range in the pixel block 201 is wide. In this case, if the exposure condition calculation unit 111 determines a calculated exposure value based on the brighter portions, the exposure value is excessively dark for the darker portions, and noise becomes more likely to occur. In the pixel block histogram in FIG. 6C, there are many portions with the same brightness in the pixel block 201, compared to the pixel block histogram in FIG. 6A. Specifically, the dynamic range in the pixel block 201 is low, and in a case where the exposure condition calculation unit 111 outputs a calculated exposure value based on the brighter portions, the exposure value is appropriate for most of the pixels 202 in the pixel block 201.

In step S502, maximum and minimum BIN numbers of the histogram are acquired. A BIN is a number representing brightness corresponding to a frequency of the histogram. In the histogram in FIG. 6A, a maximum BIN number 601 is a maximum BIN number, and a minimum BIN number 602 is a minimum BIN number. At this time, a threshold 603 can be set for the frequencies of the histogram, and only the BIN numbers that exceed the threshold 603 can be selected as minimum or maximum BIN number. In this case, the minimum BIN number is a minimum BIN number 604. This processing makes it possible to exclude frequencies caused by noise or scratches on the sensor. Further, in the histogram in FIG. 6B, the maximum BIN number is a maximum BIN number 605, and the minimum BIN number is a minimum BIN number 606.

In step S503, a representative value of the maximum BIN number and a representative value of the minimum BIN number are calculated. Each representative value can be an intermediate value of the minimum brightness and the maximum brightness of the BIN, one of the minimum value and the maximum value, or another value. For example, in a case where the darkest value and the brightest value of the maximum BIN number 605 in FIG. 6B are respectively 4001 and 4095 and an intermediate value is used as a representative value, the representative value is 4047.

In step S504, luminance contrast 145 is calculated from the representative values of the minimum and maximum BIN numbers. The luminance contrast 145 can be a logarithmic value or another value. For example, in a case where the representative values of the minimum and maximum BIN numbers in the histogram in FIG. 6B are 15 and 4047, the ratio between the minimum and maximum BIN numbers is 269.8. This becomes 8 in a logarithmic expression. While the brightness histogram within the pixel block 201 is used to calculate the luminance contrast 145 as an example in the flowchart in FIG. 5, the luminance contrast 145 can be calculated simply from the darkest pixel value and the brightest pixel value in the pixel block 201. In this case, a threshold can be set for the pixel values and a pixel value within the range can be selected in order to ignore anomalous data such as noise or scratches on the sensor.

In step S505, a correction amount for the exposure value is determined based on the luminance contrast 145. At this time, the correction amount is determined by reading a correction parameter 403 from the exposure condition correction parameter storage unit 402 in the exposure condition correction unit 142 based on the luminance contrast 145. Data stored in the exposure condition correction parameter storage unit 402 is, for example, tabular data as illustrated in FIG. 7, and the description continues. For example, in a case where the representative values of the minimum and maximum BIN numbers are 15 and 4047, respectively, in the histogram in FIG. 6B, the contrast value is 8, and the correction parameter 403 corresponding to the contrast value of 8 in FIG. 7 is −4. The above-described example of data stored in the exposure condition correction parameter storage unit 402 is a mere example, and any other forms and values can be used. In the histogram in FIG. 6C, the minimum and maximum BIN numbers are the same, so that the luminance contrast 145 is zero, and a correction parameter corresponding to the contrast value of zero in FIG. 7 is zero. In this case, no exposure value correction is performed, and thus the exposure value correction is performed only on the pixel blocks 201 with high luminance contrast 145.

In step S506, the exposure value is changed based on the correction parameter. In a case where the correction parameter is −4 and the exposure value calculated by the exposure condition calculation unit 111 is 5.0, the corrected exposure value is 1.0, whereby the exposure value can be changed toward brighter imaging. It becomes possible to perform imaging using the exposure value that does not cause noise on dark portions where noise occurs within the region. This case is an example of a case of reducing noise in dark portions when there are bright portions and the dark portions in the same pixel block 201. In a case where the exposure condition calculation unit 111 performs an operation of calculating an exposure value suitable for dark portions, the bright portions may be overexposed if there are bright portions and dark portions in the same pixel block 201. In this case, changing the correction parameter 403 stored in the exposure condition correction parameter storage unit 402 to a positive value enables correction to a higher exposure value (a setting for darker imaging), and overexposure of a subject is prevented.

After the processing of the exposure condition correction unit 142 ends, the exposure condition conversion unit 144 rounds the corrected exposure value 143 output from the exposure condition correction unit 142 to an integer and converts the obtained value into the exposure time 112 and the analog gain 113. Methods for the conversion are not specified, but an example is a method for converting into the exposure time 112 and the analog gain 113 by setting a table for conversion and referring to the set table using the input corrected exposure value 143 as an index.

Performing the above-described exposure value correction makes it possible to change an exposure condition in a case where there is a significant difference in luminance within a pixel block 201. This makes it possible to reduce anomalies in image quality, such as noise and overexposure, while performing correction to maintain the effect of high dynamic range (HDR).

Figure 9:
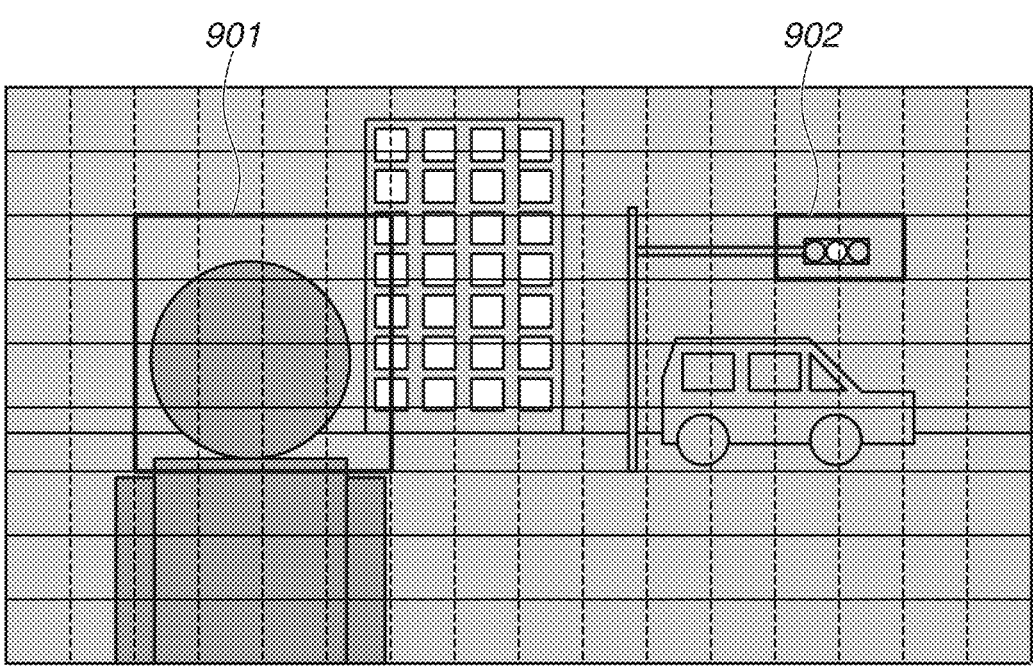
FIG. 9 is a diagram illustrating an example of an imaging scene for which regions of interest are set.

A second exemplary embodiment of the present disclosure will now be described with reference to FIG. 8. A basic functional block diagram of the imaging apparatus 100 is similar to that according to the first exemplary embodiment, and redundant descriptions thereof are thus omitted. A difference from the first exemplary embodiment is the inclusion of a region-of-interest setting unit 802 in the exposure condition correction unit 142. According to the present exemplary embodiment, an exposure value correction level is changed based on a feature of a subject of interest. A case will be described as an example. In the case, face detection is performed in a region 901 and traffic light detection is performed in a region 902 in imaging of a night scene as illustrated in FIG. 9. The regions 901 and 902 can be set by performing recognition processing on the exposure image 122, the tone-expanded image 123, and/or the tone-converted image 124 in the imaging apparatus 100. Further, the processing can be performed outside the imaging apparatus 100, and region information can be written to the region-of-interest setting unit 802. Alternatively, region information set by a user can be written to the region-of-interest setting unit 802.

It is firstly assumed that the exposure condition calculation unit 111 performs operations to set an exposure value for suitably imaging bright portions in a pixel block 201. In the night scene as illustrated in FIG. 9, the face of the person in the region 901 is often in a darker state than nearby streetlights and building lighting.

Thus, noise may occur in the face portion, or a dark image that is difficult to recognize may be captured. In this case, noise in the dark face portions can be reduced by determining the correction value in step S505 using the correction parameter 403 illustrated in FIG. 7 in a case where the exposure condition correction unit 142 is to perform processing in the blocks corresponding to the region 901. The recognition processing used in setting the region 901 can be processing of determining whether there is a face or processing of identifying whose face it is. At this time, after the region 901 is set by the processing of determining whether there is a face, the processing of the exposure condition correction unit 142 can be performed to reduce noise, and thereafter the processing of identifying whose face it is can be performed. While the processing on faces such as the region 901 is described above as an example, processing targets are not limited to faces and can be a number plate, characters, or traffic lights.

In contrast, the region 902 includes a traffic light emitting light, and if the exposure condition correction unit 142 determines the correction value using the correction parameter 403 illustrated in FIG. 7 in step S505, the correction may be performed toward higher brightness, causing overexposure of the portion of the emitted light of the traffic light. In order to avoid the foregoing situation, the correction value is forcibly set to zero in a case where the exposure condition correction unit 142 is to perform processing in the blocks corresponding to the region 901, whereby overexposure is prevented. The present exemplary embodiment is not limited to those described above, and the correction parameter 403 for the region 901 and the correction parameter 403 for the region 902 can be prepared separately and stored in the exposure condition correction parameter storage unit 402 for reference.

While examples have been described of the setting in the region-of-interest setting unit 802 on the night scene as illustrated in FIG. 9 and the correction parameter 403 stored in the exposure condition correction parameter storage unit 402 for the night scene according to the present exemplary embodiment, the setting can be performed again for another imaging scene or based on a subject type.

Performing the above-described exposure value correction makes it possible to change an exposure condition based on an imaging scene or a feature of a subject in a case where there is a significant difference in luminance within a pixel block 201. As a result, this makes it possible to reduce anomalies in image quality, such as noise and overexposure, while performing correction to maintain the effect of HDR.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-000708, filed Jan. 5, 2023, which is hereby incorporated by reference herein in its entirety.

What is claimed is:

1. An image processing apparatus configured to process image data captured by an image sensor that allows setting of an exposure value for each region of the image sensor, the image processing apparatus comprising:

at least one memory storing instructions; and at least one processor executing the instructions causing the processor to:

set the exposure value for each region based on a magnitude of luminance contrast in each region;

calculate the exposure value for each region; and correct the exposure value calculated based on the magnitude of luminance contrast in each region, wherein the exposure value set is corrected, and the luminance contrast is calculated based on a difference between a first pixel value and a second pixel value for each region.

2. The image processing apparatus according to claim 1, wherein the luminance contrast is calculated based on a histogram of brightness for each region.

3. The image processing apparatus according to claim 1, wherein the exposure value calculated is corrected using tabular data for determining a correction value based on the luminance contrast.

4. The image processing apparatus according to claim 1, wherein a frequency threshold is set in selecting a bright BIN of the histogram and a dark BIN of the histogram and selects the bright BIN and the dark BIN from BINs exceeding the frequency threshold.

5. The image processing apparatus according to claim 1, wherein a pixel value threshold is set in calculating the luminance contrast based on the difference between the first pixel value and the second pixel value of each region and selects a pixel value within a range of the pixel value threshold.

6. An image processing method for processing image data captured by an image sensor that allows setting of an exposure value for each region of the image sensor, the image processing method comprising:

setting the exposure value for each region based on a magnitude of luminance contrast in each region;
calculating the exposure value for each region; and correcting the exposure value calculated based on the magnitude of luminance contrast in each region,
wherein the exposure value is corrected, and the luminance contrast is calculated based on a difference between a first pixel value and a second pixel value for each region.

7. A non-transitory storage medium storing a program causing an image processing apparatus configured to process image data captured by an image sensor that allows setting of an exposure value for each region of the image sensor to execute an image processing method, the image processing method comprising:

setting the exposure value for each region based on a magnitude of luminance contrast in each region;
calculating the exposure value for each region; and
correcting the exposure value calculated based on the magnitude of luminance contrast in each region,
wherein the exposure value is corrected, and the luminance contrast is calculated based on a difference between a first pixel value and a second pixel value for each region.

* * * * *